United States Patent
Schwartzstein

[11] 3,709,141
[45] Jan. 9, 1973

[54] COOKING INSTRUMENT

[75] Inventor: Frederick Schwartzstein, Trenton, N.J.

[73] Assignee: Blackstone Industries, Inc., Trenton, N.J.

[22] Filed: May 3, 1971

[21] Appl. No.: 139,497

[52] U.S. Cl. ............... 99/343, 99/419, 99/421 TP, 165/185
[51] Int. Cl. ............................................. A47j 37/04
[58] Field of Search ..99/342, 419, 420, 421 TP, 343; 165/105, 135, 185

[56] References Cited

UNITED STATES PATENTS

| | | | |
|---|---|---|---|
| 2,898,845 | 8/1959 | Dight | 99/421 TP |
| 3,584,683 | 6/1971 | Gordon | 99/419 |
| 3,108,532 | 10/1963 | Ray et al. | 99/421 TP |
| 2,276,178 | 3/1942 | Ford | 99/421 TP UX |
| 2,835,480 | 5/1958 | Perez | 99/419 UX |

Primary Examiner—Billy J. Wilhite
Assistant Examiner—Arthur O. Henderson
Attorney—Sperry and Zoda

[57] ABSTRACT

A heat transmitting device for conducting heat into the interior of a roast or other body of food to aid in the rapid and more uniform cooking thereof, is provided with a probe for insertion into the food and has heat absorbing fins or elements connected thereto for transmitting heat to the probe to raise its temperature up to or approaching the temperature of an oven or other space in which food being cooked is located. A temperature responsive device located within the heat transmitting probe is connected to a thermometer or other indicating device to indicate the temperature of the food adjacent to the probe whereby it is possible to determine whether the food is being uniformly and satisfactorily cooked.

2 Claims, 1 Drawing Figure

PATENTED JAN 9 1973
3,709,141
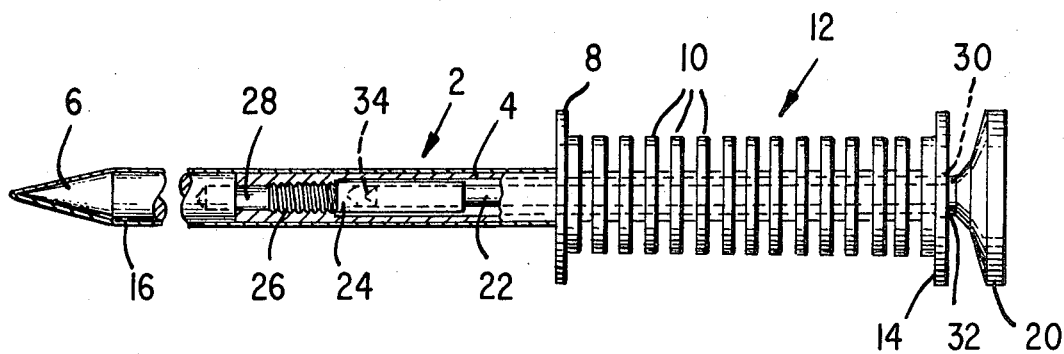
INVENTOR,
FREDERICK SCHWARTZSTEIN
BY Sperry and Zoda
ATTORNEYS

COOKING INSTRUMENT

FIELD OF INVENTION

It has been suggested heretofore that heat transmitting pins or skewers be inserted into meats or other food products to speed up the transfer of heat to the interior thereof and aid in the rapid and more nearly uniform cooking of foods. For this purpose the pin may be provided with heat absorbing fins or projections by which heat from an oven or other enclosure in which the food is located can be transmitted to the pin. Typical constructions of this type are disclosed in U.S. Pat. Nos. 2,651,251; 2,835,480; and 3,379,118.

It is also common practice to provide meat thermometers with a pin adapted to be inserted into meat or other food to indicate the temperature of an interior portion of the food being cooked. However, such pins or probes do not always give an accurate reading of the temperature of the food and in some cases at least they tend to conduct heat away from the interior of the food so as to retard the cooking operation and develop areas which are reduced in temperature adjacent the thermometer probe.

In accordance with the present invention a heat transmitting pin or probe for aiding in the rapid and uniform cooking of foods is provided with a thermometer having an element located within the heat transmitting probe so as to accurately indicate the temperature of the food adjacent the probe and to which heat is being transmitted by the probe.

FIGURES OF THE DRAWING

The drawing is a side elevation, partly in section, illustrating a typical embodiment of the present invention.

PREFERRED EMBODIMENT OF THE PRESENT INVENTION

In that form of the invention chosen for purposes of illustration in the drawing the heat transmitting probe or pin 2 has a tubular body 4 formed on one end with a closed tip or point 6 adapted to facilitate insertion of the probe into a body of food to be cooked. A guard flange 8 is secured to the body 4 at a suitable point spaced from the tip 6 to limit the insertion of the probe into the article being cooked. That portion of the body extending beyond the guard 8 is provided with heat absorbing elements in the form of spaced radially projecting fins, discs or ribs 10 which preferably are of about the same diameter so as to cooperate in forming a handle 12 by which the probe may be grasped for insertion into the food and removal therefrom. The guard 8 and the outermost element 14 on the tubular body are preferably of somewhat larger diameter than the heat absorbing elements positioned therebetween so as to present a handle formation which can be grasped effectively when the pin or probe is pushed into and withdrawn from the food to be cooked.

The probe 2, including its point 6 and the tubular body 4, as well as the guard 8 and the heat conducting discs or elements 10 and 12 may be formed as a single integral assembly made of metal characterized by its high heat conductivity. Thus they may be made of copper, aluminum or stainless steel and if desired may be provided with an outer plating or layer of nickel, chromium, paint or other non-tarnishing and non-toxic material. Further, it may be desirable in some instance to provide the body and tip of the pin with a coating of "Teflon" or other heat resistant material which possesses "non-sticking" properties to facilitate the insertion and removal of the pin. For purposes of illustration, any or a combination of such external platings or coatings are indicated at 16 in the drawing.

The heat transmitting pin of the present invention is provided with a thermometer for indicating the temperature of the food being cooked at an interior portion of the food. For this purpose a thermometer 20 is provided with a stem 22 which is of smaller diameter than the interior of the tubular body 4 of the pin. A heat conducting head 24 is attached to the inner end of the stem 22 of the thermometer and is threaded externally at 26 to engage and cooperate with an internally threaded recess 28 formed in the inner end of the point 6 of the pin. A sealing washer 30 surrounds the outer end of the stem 22 of the thermometer and fits within a corresponding recess in the outer surface of the larger heat conducting disc or element 14 in position to be engaged by a collar 32 on the inner side of the thermometer 20. Accordingly, when the head 24 on the inner end of the stem 22 of the thermometer is threaded into the recess 28 in the point of the pin the collar 32 will force the washer 30 against the element 14 and into position to seal the outer end of the tubular body 4 of the pin.

The heat conducting head 24 attached to the inner end of the stem 22 of the thermometer is formed of metal or other material having high heat conductivity and is preferably of such diameter that its outer surface will engage or be positioned closely adjacent and in heat transferring relation to the inner surface of the tubular body 4. Suitable heat sensing means 34 which actuate the thermometer are enclosed by the head 24 so that the temperature recorded by the thermometer will be the temperature of the portion of the pin adjacent thereto. The portion of the probe adjacent to the head will at the same time be determined by the temperature of the meat or food directly in contact with the exterior of the probe so that the thermometer will actually indicate the temperature of the food at the location where the head of the thermometer is positioned.

In using the construction of the present invention the pin or probe carrying the thermometer is thrust into the food to be cooked and the food with the probe therein is placed in an oven or other enclosure. The food will of course be cooked from the outside toward the center by radiation from the oven walls and heating elements and by the transfer of heat from the air in the oven and about the food toward the center of the food. However, the air in the oven will also serve to raise the temperature of the heat conducting elements forming the exposed handle portion of the pin or probe. These elements transmit heat to the tubular body and tip of the pin as to raise its temperature and cause the food to be cooked from the inside toward the outside thereof. In this way the food is not only cooked much more rapidly, but at a much more even and uniform temperature. Moreover the thermometer serves to assure the desired extent or degree of cooking of the interior portion of the meat so that if it is desired to have the center of a roast or the like more rare than the outer portion thereof, the heat transmitting pin can be allowed to remain in place until the thermometer indicates the interior of the roast has been cooked to the extent desired. The pin and thermometer can then be withdrawn from the interior of the food and the outer portion of the roast can be cooked further as desired.

The construction thus provided is simple and economical to produce and extremely easy to use. The form and design of the various elements of the assembly are of course capable of many modifications and variations. It should therefore be understood that the particular embodiment shown in the drawing and described above is intended to be illustrative only and is not intended to limit the following claims.

I claim:

1. A heat transmitting device for use in cooking foods comprising a probe having a tubular body made of material of high heat conductivity, said body being closed at one end into the form of a point for insertion into the food to be cooked, radially extending heat conducting elements of high heat conductivity spaced from the point of the probe and connected to the tubular body to conduct heat to said body for promoting the cooking of the food into which the probe is inserted, a thermometer connected to said probe and located adjacent the end thereof remote from the point of the probe, a stem attached at one end thereof to the thermometer and extending into said tubular body, said stem being of smaller diameter than said tubular body and spaced therefrom throughout the length thereof, a head secured to said stem adjacent the opposite end thereof and positioned within said tubular body near the point of the probe, said head having a threaded engagement with the tubular body adjacent the point of the probe and being in direct heat conducting contact therewith, and sensing means for actuating the thermometer carried by said head.

2. A heat transmitting device as defined in claim 1, wherein the end of the tubular body opposite to that on which the point is formed, is provided with sealing means, and said thermometer has means thereon engaging said sealing means and serving to hold the sealing means in engagement with the tubular body, said thermometer, stem and head being fixedly connected together and dimensioned so that upon threading of the head into the tubular body, the thermometer will be urged into sealing contact with said sealing means.

* * * * *